United States Patent
Yin et al.

(10) Patent No.: US 11,487,931 B1
(45) Date of Patent: Nov. 1, 2022

(54) REPLAYING A WEBPAGE BASED ON VIRTUAL DOCUMENT OBJECT MODEL

(71) Applicant: INTERNATIONAL BUSINESS MACHINES CORPORATION, Armonk, NY (US)

(72) Inventors: Wen Bao Yin, Shanghai (CN); Jun Liao, Shanghai (CN); Rui Shen, Shanghai (CN); Dan Dan Wang, Shanghai (CN); Shiwen He, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/451,186

(22) Filed: Oct. 18, 2021

(51) Int. Cl.
G06F 17/10 (2006.01)
G06F 40/103 (2020.01)
(Continued)

(52) U.S. Cl.
CPC ............ G06F 40/103 (2020.01); G06F 40/14 (2020.01); G06F 40/151 (2020.01); G06F 40/205 (2020.01)

(58) Field of Classification Search
CPC .... G06F 40/103; G06F 40/205; G06F 40/151; G06F 40/14
See application file for complete search history.

(56) References Cited

U.S. PATENT DOCUMENTS 7,210,097 B1 * 4/2007 Clarke ..................... G06F 16/86
715/227

7,590,644 B2 * 9/2009 Matsakis ................... G06F 8/41
715/239

(Continued)

FOREIGN PATENT DOCUMENTS

CN 106599016 A * 4/2017
CN 106599016 A 4/2017
(Continued)

OTHER PUBLICATIONS

Disclosed Anonymously, Method for Recording Web Screens Without Second Pass for Rendering, IP.com, IP.com No. IPCOM000210128D, IP.com Publication Date: Aug. 26, 2011, 5 pages.

(Continued)

Primary Examiner — Shahid K Khan
(74) Attorney, Agent, or Firm — Anthony M. Pallone

(57) ABSTRACT

According to one embodiment, a method, computer system, and computer program product for webpage replay is provided. The embodiment may include acquiring one or more commands each indicating changes of at least one virtual Document Object Model (DOM) node of a virtual DOM of a webpage corresponding to a timestamp for a session. The embodiment may include determining one or more virtual DOM differentials corresponding to respective timestamps for the session based on the one or more commands and a first data dictionary. The first data dictionary is created based on a base virtual DOM of the webpage including a plurality of virtual DOM nodes. The embodiment may include generating one or more patched virtual DOMs of the webpage corresponding to respective timestamps for the session. The embodiment may include replaying the webpage for the session based on the base virtual DOM and the patched virtual DOMs.

18 Claims, 12 Drawing Sheets

(51) Int. Cl.
*G06F 40/205* (2020.01)
*G06F 40/151* (2020.01)
*G06F 40/14* (2020.01)

(56) References Cited

U.S. PATENT DOCUMENTS

| | | | |
|---|---|---|---|
| 8,670,529 B1* | 3/2014 | Fomin | H04L 65/1083 |
| | | | 379/265.09 |
| 9,104,809 B2 | 8/2015 | Prasad | |
| 10,102,306 B2 | 10/2018 | Le Bras | |
| 10,282,127 B2* | 5/2019 | Battaje | G06F 3/067 |
| 10,318,592 B2* | 6/2019 | Ciabarra, Jr. | G06F 40/131 |
| 10,656,984 B2* | 5/2020 | Ciabarra, Jr. | H04L 67/10 |
| 11,036,823 B2* | 6/2021 | Ciabarra, Jr. | G06F 40/123 |
| 11,100,275 B2* | 8/2021 | Ciabarra, Jr. | G06F 40/143 |
| 11,184,406 B1* | 11/2021 | Shashank | H04L 67/1095 |
| 11,194,885 B1* | 12/2021 | Parhami | G06F 16/9577 |
| 11,232,253 B2* | 1/2022 | Ciabarra, Jr. | G06F 16/9574 |
| 2012/0173966 A1* | 7/2012 | Powell | G06F 16/93 |
| | | | 715/234 |
| 2014/0108911 A1* | 4/2014 | Damale | H04L 67/14 |
| | | | 709/201 |
| 2017/0323026 A1* | 11/2017 | Le Bras | G06F 16/2358 |
| 2019/0095408 A1* | 3/2019 | Ciabarra, Jr. | G06F 40/123 |
| 2019/0146616 A1 | 5/2019 | White | |
| 2019/0361717 A1* | 11/2019 | Santos | H04N 5/76 |
| 2021/0067492 A1* | 3/2021 | Mastracci | G06F 11/3438 |

FOREIGN PATENT DOCUMENTS

| | | | | |
|---|---|---|---|---|
| CN | 107608675 A | | 1/2018 | |
| CN | 105630902 B | | 3/2019 | |
| CN | 109739500 A | | 5/2019 | |
| CN | 111898055 A | | 11/2020 | |
| CN | 112148579 A | * | 12/2020 | |
| CN | 112269958 A | * | 1/2021 | |
| CN | 113254320 A | | 8/2021 | |
| CN | 113656119 A | * | 11/2021 | |
| WO | WO-0133387 A2 | * | 5/2001 | G06F 16/30 |
| WO | WO-2013137982 A1 | * | 9/2013 | G06F 17/2211 |

OTHER PUBLICATIONS

Mell et al., "The NIST Definition of Cloud Computing", National Institute of Standards and Technology, Special Publication 800-145, Sep. 2011, 7 pages.

Github, "rrweb-io /rrweb," Accessed Oct. 18, 2021, https://github.com/rrweb-io/rrweb, 4 pages.

* cited by examiner

```
EXAMPLE BASE DOM CODE SNIPPET 700:
<DOCTYPE html>
<body>
    <div>
        <div class="warning38"></div>
        <textarea readonly="readonly" class="monospaced" rows="5"></textarea>
        <div class="forceDeleteDiv">
            <label><input name="somevalue"/>
                <Text_Node_Value="Some messages"/>
            </label>
        </div>
    </div>
</body>
```

FIG. 7

```
EXAMPLE BASE VIRTUAL DOM CODE SNIPPET 800:
{
    tag: "body",
    children: [{
        tag: "div",
        children: [{
            tag: "div",
            class: "warning38"
        }, {
            tag: "textarea",
            readonly: "readonly",
            class: "monospaced",
            rows: "5"
        }, {
            tag: "div",
            class: "forceDeleteDiv",
            children: [{
                tag: "label",
                children: [{
                    tag: "input",
                    name: "somevalue"
                }, {
                    tag: "TEXT_NODE",
                    value: "some messages"
                }]
            }]
        }]
    }]
}
```

FIG. 8

```
EXAMPLE DOM CODE SNIPPET 900:
<DOCTYPE html>
<body>
    <div>
        <div class="warning38"></div>
        <textarea readonly="readonly" class="monospaced" rows="5"></textarea>
        <div class="forceDeleteDiv">
            <label><input name="somevalue"/>
                    <Text_Node_Value="Some messages"/>
            </label>
            <div  class="footer">  <Text_Node_Value="here is the footer"/></div>//additions
nodes//                                                        of two DOM nodes//
        </div>
    </div>
</body>
```

FIG. 9

```
EXAMPLE VIRTUAL DOM CODE SNIPPET 1000:
{
  tag: "body",
    children: [{
        tag: "div",
        children: [{
            tag: "div",
            class: "warning38"
        }, {
            tag: "textarea",
            readonly : "readonly",
            class: "monospaced",
            rows: "5"
        }, {
            tag: "div",
            class: "forceDeleteDiv",
            children: [{
                tag: "label",
                children: [{
                    tag: "input",
                    name: "somevalue"
                }, {
                    tag: "TEXT_NODE",
                    value: "some messages"
                }]
            }]
        }, {
            tag: "div",
            class: "footer",
            child: [{
                tag: "TEXT_NODE",
                value: "here is the footer"
            }]
        }]
    }]
}
```

FIG. 10

```
EXAMPLE DOM CODE SNIPPET 1100:
<DOCTYPE html>
<body>
    <div>
       <div class="warning38"></div>
        <textarea readonly="readonly" class="monospaced" rows="5"></textarea>
         <div class="forceDeleteDiv">
             <label><input name="somevalue"/>
                     new messages //modifications to the DOM node//
             </label>
             <div class="footer">here is the footer </div>
         </div>
    </div>
</body>
```

FIG. 11

```
EXAMPLE BASE VIRTUAL DOM CODE SNIPPET 1200:
{
  tag: "body",
    children: [{
        tag: "div",
        children: [{
            tag: "div",
            class: "warning38"
        }, {
            tag: "textarea",
            readonly: "readonly",
            class: "monospaced",
            rows: "5"
        }, {
            tag: "div",
            class: "forceDeleteDiv",
            children: [{
                tag: "label",
                children: [{
                    tag: "input",
                    name: "somevalue"
                }, {
                    tag: "TEXT_NODE",
                    value: "new messages"
                }]
            }]
        }, {
            tag: "div",
            class: "footer",
            child: [{
                tag: "TEXT_NODE",
                value: "here is the footer"
            }]
        }]
    }]
}
```

REPLAYING A WEBPAGE BASED ON VIRTUAL DOCUMENT OBJECT MODEL

BACKGROUND

The present invention generally relates to replaying a webpage and more specifically, relates to replaying a webpage based on virtual Document Object Model (DOM).

In modern electronic business system, vendors may want to collect client behavior data for further analysis to improve their e-business services or adjust future business strategies. Technically, how to monitor users' behavior on the browser side has become an important issue. Webpage replay is one of the most popular technologies in web analytics and customer experience management. The webpage replay is the ability to replay a user's session on a webpage or website or in a web application. The webpage replay may be used for improving website conversion, website usability and customer behavior analysis because the user's session with all interactions can be replayed and reviewed.

SUMMARY

According to one embodiment, a method, computer system, and computer program product for webpage replay is provided. The embodiment may include acquiring one or more commands each indicating changes of at least one virtual Document Object Model (DOM) node of a virtual DOM of a webpage corresponding to a timestamp for a session. The embodiment may include determining one or more virtual DOM differentials corresponding to respective timestamps for the session based on the one or more commands and a first data dictionary. The first data dictionary is created based on a base virtual DOM of the webpage including a plurality of virtual DOM nodes. The embodiment may include generating one or more patched virtual DOMs of the webpage corresponding to respective timestamps for the session. The embodiment may include replaying the webpage for the session based on the base virtual DOM and the patched virtual DOMs.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 7 depicts an example base DOM code snippet of the webpage according to embodiments of the present disclosure.

FIG. 8 depicts an example base virtual DOM code snippet corresponding the example base DOM code snippet according to some embodiments of the present disclosure.

FIG. 9 depicts an example DOM code snippet corresponding to timestamp T1 according to some embodiments of the present disclosure.

FIG. 10 depicts an example virtual DOM code snippet corresponding to timestamp T1 according to some embodiments of the present disclosure.

FIG. 11 depicts an example DOM code snippet corresponding to timestamp T2 according to some embodiments of the present disclosure.

FIG. 12 depicts an example virtual DOM code snippet corresponding to timestamp T2 according to embodiments of the present disclosure.

DETAILED DESCRIPTION

Figure 1:
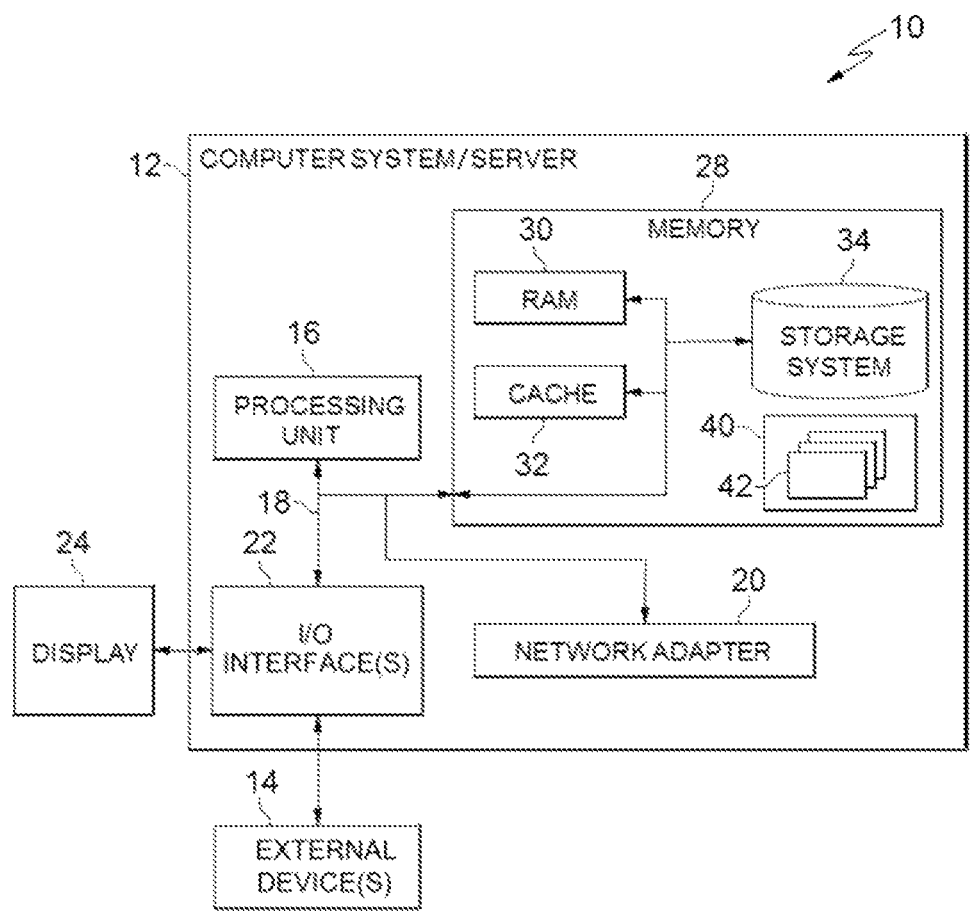
FIG. 1 depicts a cloud computing node according to some embodiments of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
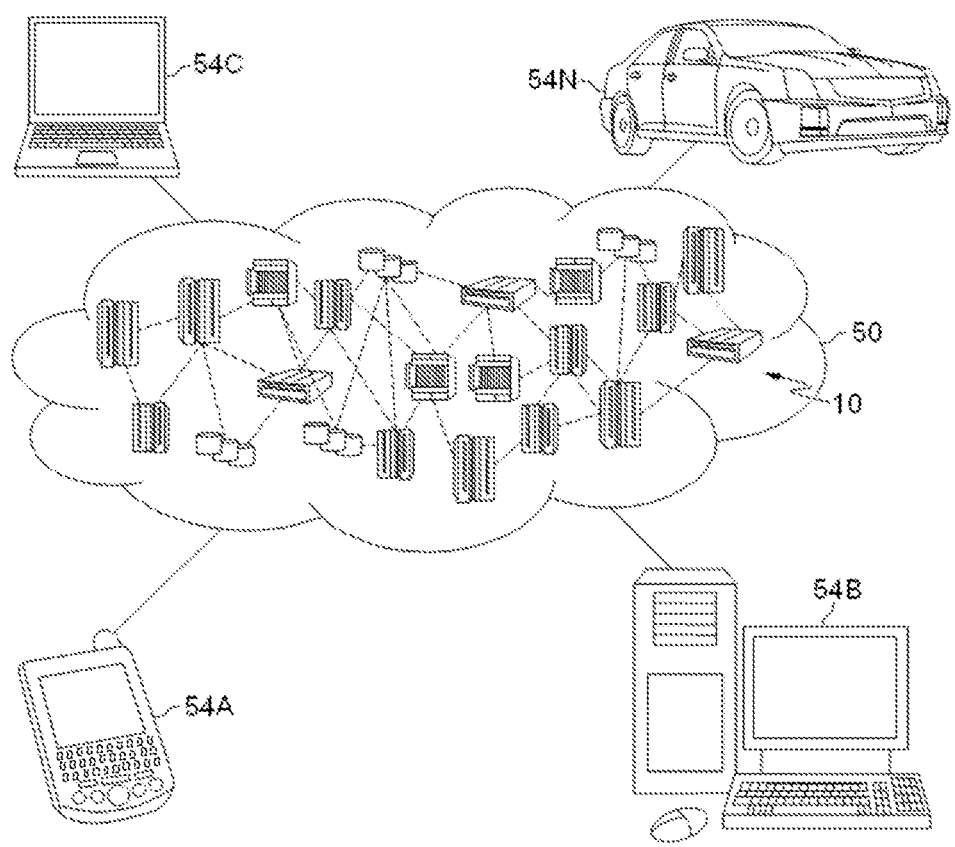
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
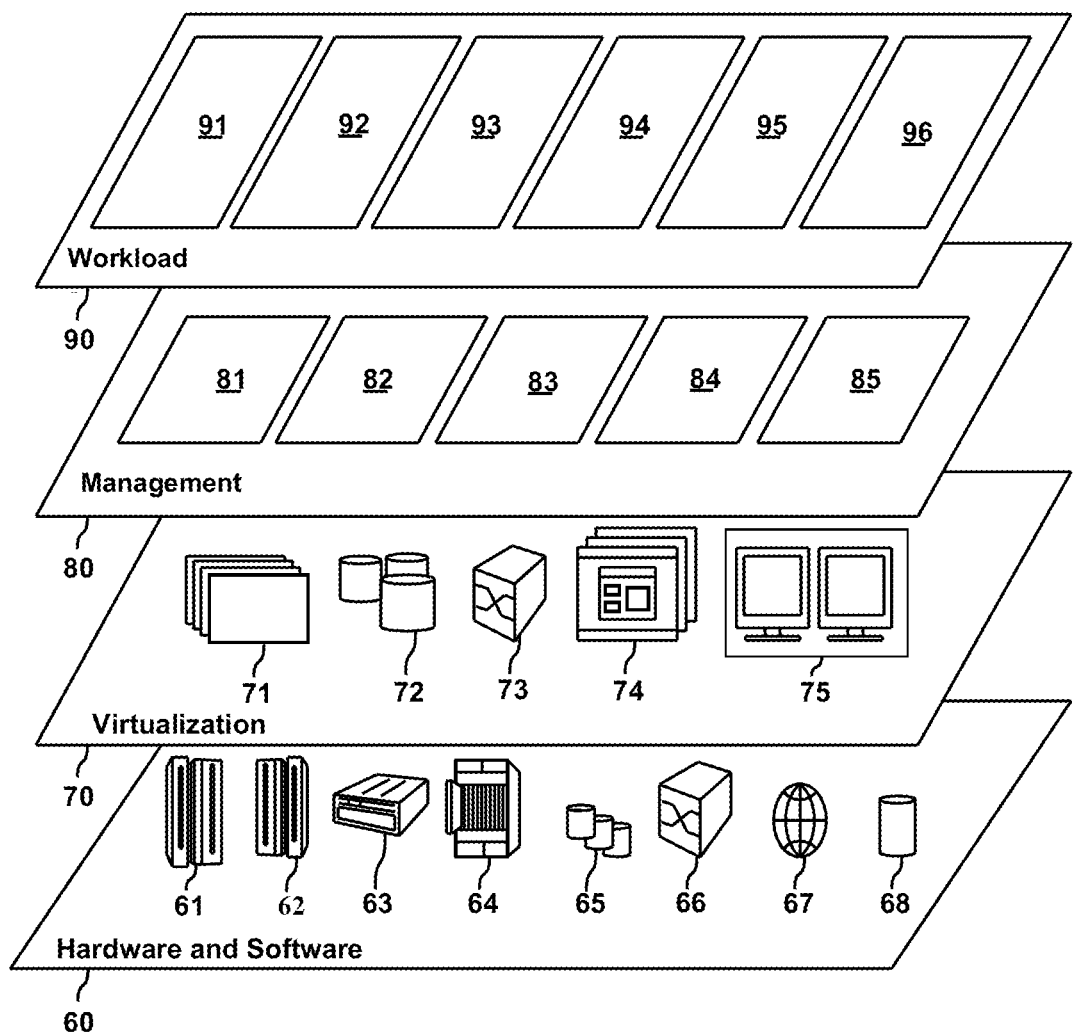
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and webpage replay 96. Webpage replay 96 may relate to replaying a user's webpage session.

It should be noted that the webpage replay method according to embodiments of this disclosure could be implemented by computer system/server 12 of FIG. 1.

Figure 4:
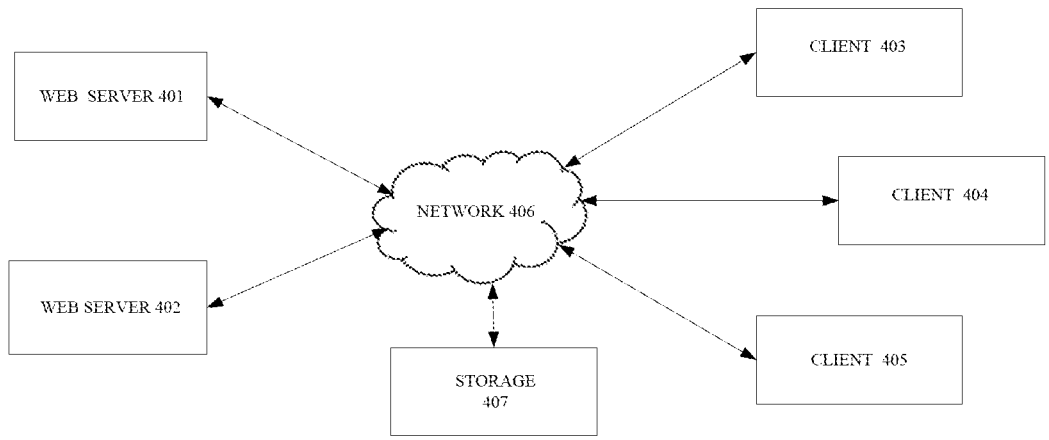
FIG. 4 depicts an example webpage access system according to some embodiments of the present embodiments.

FIG. 4 depicts an example webpage access system according to some embodiments of the present embodiments. The webpage access system 400 includes web servers 401, 402, clients 403, 404 and 405, a network 406 and a storage 407. The web servers 401, 402, the clients 403, 404 and 405 and the storage 407 are connected via the network 406. Web browsers of the clients 403, 404 and 405 may access webpages provided by the web servers 401 and 402 via the network 406. By way of example, the client 403 may send a webpage request to the web server 401. The web server 401 may send a webpage response including a webpage written in hypertext markup language (HTML) to the client 403. After receiving the response, a web browser of the client 403 may obtain required resources for rendering the webpage so as to construct a browser representation of the webpage. In some embodiments of the present disclosure, the browser representation may be a Document Object Model (DOM) representation of the webpage. The web browser may display the webpage on a graphical user interface (GUI) utilizing the DOM representation.

A DOM is a cross-platform and language-independent convention for representing interactions with objects in HTML, extensible hypertext markup language (XHTML) and extensible markup language (XML) documents corresponding to webpages. All contents including texts, a picture, video, an interactive window specified in a markup language document can be organized into DOM nodes in a tree structure known as a DOM tree. The entire markup language document may be represented by the DOM tree. Contents of the documents may be represented by subsequent level nodes. A DOM representation typically has a logical structure that resembles a DOM tree or a group of DOM trees each having branches that link DOM nodes of a plurality of DOM levels. A given DOM node at one DOM level of the DOM tree may have one or more "child" nodes each logically arranged in a lower DOM level.

Current webpage replay may include a full DOM replay solution and a differential DOM replay solution. The full DOM replay solution is replaying user interactions on a webpage for a session using a plurality of captured whole DOMs (i.e., capturing the entire DOM at each defined event) corresponding to the webpage. The captured whole DOM of a webpage is transferred to a web server for webpage replay. The differential DOM replay solution is replaying user interactions on a webpage using captured base DOM differentials (i.e., capturing only differences or changes to a base DOM and applying the differences to the base DOM) corresponding to the webpage. However, it is discovered that date transfer over a network for both the full DOM and the differential DOM may lead to inefficiency and waste of network resources.

In order to at least partially address the above issue, embodiments of the present disclosure proposes a new virtual Document Object Model (virtual DOM) based webpage replay method. According to the embodiments of the present disclosure, without transferring the full DOM or the differential DOM of the webpage to a web server, the client can generate one or more simplified commands indicating virtual DOM changes of the webpage to the web server and transfer the one or more simplified commands to the web server, which can significantly reduce data transfer over the network and facilitate webpage replay in a more efficient way.

Virtual DOM is an abstraction of the DOM which is to replace the complex DOM structure with lightweight JavaScript objects. The virtual DOM may transform HTML DOM structure into JavaScript objects. The virtual DOM can simulate a tree structure of a DOM tree using JavaScript. A tree structure of the virtual DOM includes a plurality of virtual DOM nodes. Each of the plurality of virtual DOM nodes corresponds to a DOM node of the DOM tree. As appreciated in the art, function h( ) can be used to create a virtual node (vnode).

Figure 5:
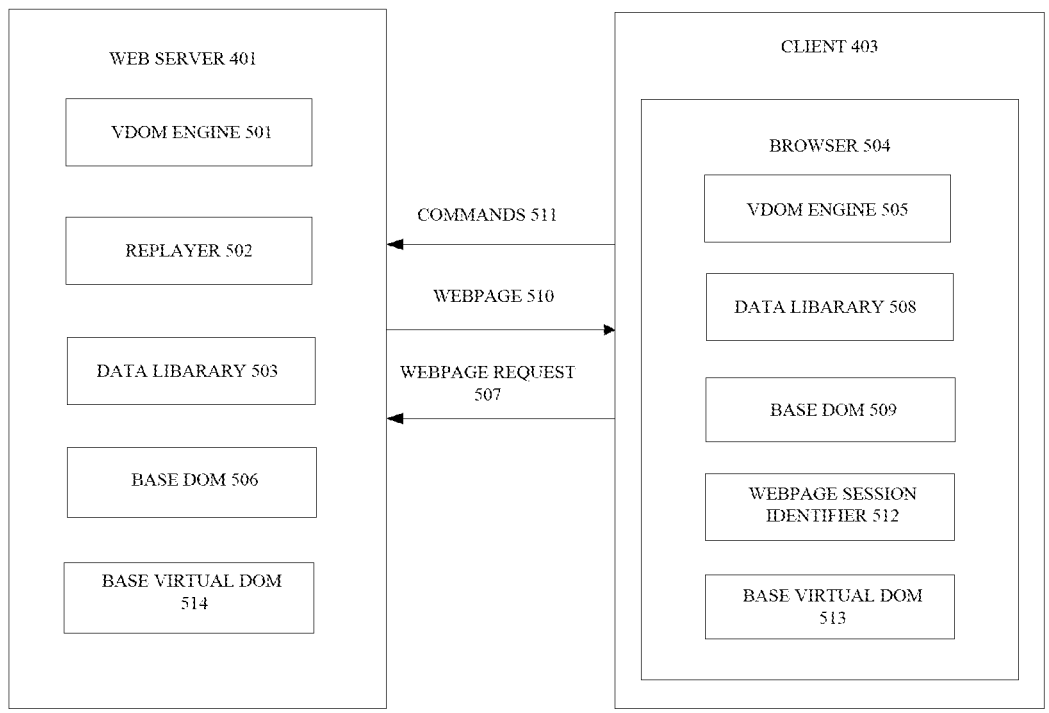
FIG. 5 depicts an example webpage replay system according to some embodiments of the present disclosure.

FIG. 5 depicts an example webpage replay system according to some embodiments of the present disclosure. The webpage replay system 500 includes the web server 401 and the client 403. The web server 401 includes a VDOM engine 501, a replayer 502, a data dictionary 503, and a base DOM 506 and a base virtual DOM 514. The client 403 includes a browser 504 which includes a VDOM engine 505, a data dictionary 508, a base DOM 509, a webpage session identifier 512 and a base virtual DOM 513.

Figure 6:
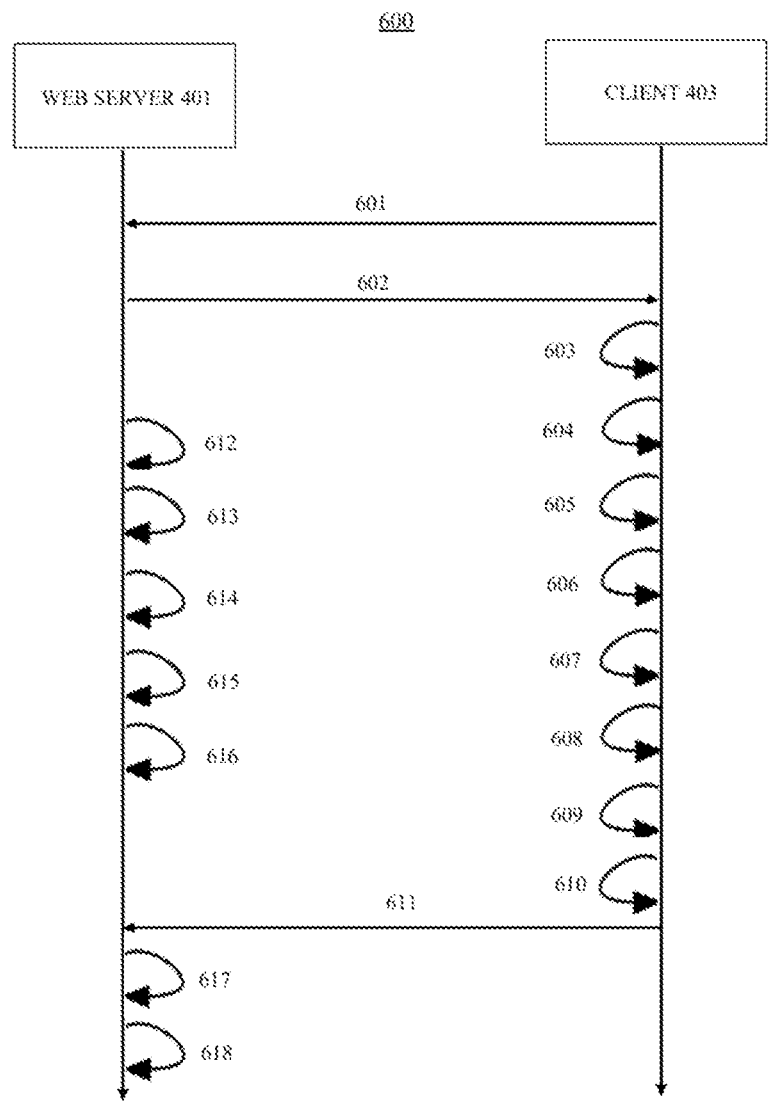
FIG. 6 depicts an interaction diagram between the web server and the client prior to webpage replay according to some embodiments of the present disclosure.

FIG. 6 depicts an interaction diagram between the web server 401 and the client 403 prior to webpage replay according to some embodiments of the present disclosure. As shown in FIG. 6, the client 403 may transmit 601 a webpage request 507 for a webpage 510 to the web server 401. In response to the webpage request 507, the web server 401 may send 602 the webpage 510 (such as, a webpage HTML document corresponding to the webpage) to the client 403.

On the client side, in response to receiving the webpage 510, the browser 504 may generate 603 the webpage session identifier 512 for session A and the base DOM 509 of the webpage 510 based on the webpage HTML document of the webpage 510. The base DOM 509 of the webpage 510 has a tree structure including a plurality of DOM nodes. By way of example, FIG. 7 depicts an example base DOM code snippet 700 of the webpage 510 according to some embodiments of the present disclosure. In total, the example HTML base DOM code snippet 700 includes eight DOM nodes which are included in Table 1.

TABLE 1

| No. | DOM Nodes |
| --- | --- |
| 0 | <body/> |
| 1 | <div/> |
| 2 | <div class="warning38"/> |
| 3 | <textarea readonly="readonly" class="monospaced" rows="5"!> |
| 4 | <div class="forceDeleteDiv"/> |
| 5 | <label/> |
| 6 | <input name="somevalue"/> |
| 7 | <Text_Node_Value= "Some messages"/> |

Then the client 403 may load 604 the VDOM engine 505. The VDOM engine 505 may transform 605 the base DOM 512 of the webpage 510 into the base virtual DOM 513 of the webpage 510. As known from above, the base virtual DOM of a webpage can simulate the tree structure of the base DOM of the webpage. The tree structure of the base virtual DOM of the webpage may include a plurality of virtual DOM nodes. Each virtual DOM node corresponds to a DOM node of the tree structure of the base DOM of the webpage. That is, each virtual DOM node corresponds to an element in the webpage. Each virtual DOM node may include for example a node tag, child nodes, node attributes, text and values etc. By way of example, FIG. 8 depicts an example base virtual DOM code snippet 800 corresponding to the example base DOM code snippet 700 according to embodiments of the present disclosure. By way of example, a virtual DOM node corresponding to DOM node "<divclass="warning38"/>" includes {tag: "div", class: "warning38"} of which a node tag is "div" and a class attribute is "warning38".

Then the browser 504 may create 606 the data dictionary 508 indicating the tree structure of the virtual DOM based on the base virtual DOM 513 of the webpage 510. The data dictionary 508 may include information regarding to the plurality of virtual DOM nodes of the virtual DOM 513. For each virtual DOM node, the information regarding to the virtual DOM node may include a node index, node indexes of child nodes and node contents. The node contents may include for example a node tag, node indexes of child nodes, node attributes, text and values etc. The node attributes of the virtual DOM node may correspond to attributes of an element in the webpage 510. By way of example, Table 2 shows an example data dictionary of the base virtual DOM code snippet 800. As shown in Table 2, the example data dictionary includes a node index, node indexes of child nodes and node contents. There are eight virtual DOM nodes each corresponding to a DOM node of the example HTML base code snippet 700 shown in Table 1. By way of example, the virtual DOM node with node index 0 corresponding to the DOM node No. 0 "<body/>" has a node tag "body" and one child node with node index 1. The virtual DOM node with node index 1 corresponding to the DOM node No. 1 "<div/>" has a node tag "div" and three child nodes with node indexes 2, 3, 4. The virtual DOM node with node index 2 corresponding to the DOM node No. 2 "<div class="warning38"/>" has a node tag "div" and class attributes "warning38" without a child node.

TABLE 2

| Node index | Node indexes of child nodes | Node contents |
|---|---|---|
| 0 | 1 | {tag: "body", child: 1} |
| 1 | 2,3,4 | {tag: "div", child: 2,3,4} |
| 2 |  | {tag: "div", class: "warning38"} |
| 3 |  | {tag: "textarea", readonly: "readonly", class: "monospaced", row:5} |
| 4 | 5 | {tag: "div", class: "foreceDeleteDiv", child: [5]} |
| 5 | 6,7 | {tag: "label", child: 6,7} |
| 6 |  | {tag: "input", name: "somevalue"} |
| 7 |  | {tag: "TEXT_NODE", value: "some messages"} |

In some embodiments, for the session A, the user's interaction with the webpage 510 may cause changes to the base virtual DOM 513 of the webpage 510 including insertion, deletion and modification of at least one virtual DOM node of the virtual DOM 513. Upon the changes to the base virtual DOM 513, the client 403 may update the data dictionary 508 so that the virtual DOM nodes in the data dictionary 508 could be consistent with the changes to base virtual DOM 509 of the webpage 510.

In some embodiments, the VDOM engine 505 may render 607 the webpage 510 based on the base virtual DOM 509 of the webpage 510 by calling a virtual DOM render function. As appreciated in the art, the virtual DOM render function may be for example path ( ). The virtual DOM render function path ( ) may include functions path (container, vnode) and path (vnode, newVnode) both of which are also an implementation of the differential Virtual DOM algorithm. The function path (container, vnode) is called upon rendering for the first time, and the function path (vnode, newVnode) is called when the rendering is updated. The user may interact with the webpage 510 for session A to generate virtual DOM differentials which represent one or more changes to the previous virtual DOM of the webpage 510. The browser 504 may capture 608 the virtual DOM differentials by creating an event monitor in the virtual DOM render function. Upon the virtual DOM render function being called, the event monitor may capture changes of at least one virtual DOM node. The changes of at least one virtual DOM node may include addition, deletion and modification of the at least one virtual DOM node. The modification of the at least one virtual DOM node may include modifications to node contents of the at least one virtual DOM node.

After the session A ends, the browser 504 may determine 609 at least one node index corresponding to the at least one virtual DOM node which have been changed corresponding to respective timestamps for the session A based on the virtual DOM differentials of the webpage 510 and the updated data dictionary 508. For each virtual DOM node that have been changed, the browser 504 may search its node contents in the data dictionary 508 to retrieve its node index. The browser 504 then may generate 610 one or more commands 511 each indicating changes of at least one virtual DOM node corresponding to a timestamp for the session A based on the at least one node index and the virtual DOM differentials. The generation rule of the commands is predefined and agreed between the web server 401 and the client 403. The client 403 may send 611 one or more commands 511 to the web server 401 together with the webpage session identifier 512. According to aspects of the present disclosure, client 403 can generate simplified commands indicating virtual DOM changes of the webpage based on the information of the data dictionary 508 and transfer the simplified commands to the web server 401 without transferring the full DOM or the differential DOM of the webpage.

In one embodiment, for the webpage session A, the user' interaction with the webpage at timestamps T1 and T2 leads to virtual DOM differentials. At timestamp T1, the user's interaction with the webpage 510 leads to addition of two DOM nodes "<div class="footer">" and "<Text_Node_Value="here is the footer"/>" to the example HTML base code 700. FIG. 9 depicts an example DOM code snippet 900 corresponding to timestamp T1 according to some embodiments of the present disclosure. The VDOM engine 505 may transform the two new DOM nodes into virtual DOM differentials.

FIG. 10 depicts an example virtual DOM code snippet 1000 corresponding to timestamp T1 according to embodiments of the present disclosure. The newly added virtual DOM code in indicates the virtual DOM differentials including two virtual DOM nodes corresponding to two DOM nodes "<div class="footer">" and "<Text_Node_Value="here is the footer"/>". The VDOM engine 505 then may render the webpage 510 based on virtual DOM differentials by calling the virtual DOM render function. The browser 504 may capture the virtual DOM differentials by the event monitor in the virtual DOM render function. Upon acquiring the virtual DOM differentials, the browser 504 may update the data dictionary in Table 2 to reflect the virtual DOM differentials. Table 3 shows an updated data dictionary of the virtual DOM code 1000. The updates involve the virtual DOM nodes with node indexes 1, 8, 9 in which two virtual DOM nodes with node indexes 8, 9 are newly added and the virtual DOM node with node index 1's child nodes are changed from three child nodes (i.e., the virtual DOM nodes with node indexes 2, 3, 4) to four child nodes (i.e., the virtual DOM nodes with node indexes 2, 3, 4, 8). The virtual DOM node with node index 8 indicates an addition of a new virtual DOM node corresponding to the new DOM node "<div class="footer">", and the virtual DOM node with node index 9 indicates an addition of a new virtual DOM node corresponding to the new DOM node "<Text_Node_Value="here is the footer"/>".

TABLE 3

| Node index | Node indexes of child nodes | Node contents |
|---|---|---|
| 0 | 1 | {tag: "body", child: 1} |
| 1 | 2,3,4,8 | {tag: "div", child: 2,3,4,8} |
| 2 |  | {tag: "div", class: "warning38"} |
| 3 |  | {tag: "textarea", readonly: "readonly", class: "monospaced", row:5} |
| 4 | 5 | {tag: "div", class: "foreceDeleteDiv", child: [5]} |
| 5 | 6,7 | {tag: "label", child: 6,7} |
| 6 |  | {tag: "input", name: "somevalue"} |
| 7 |  | {tag: "TEX_ NODE", value: "some messages"} |
| 8 | 9 | {tag: "div", class: "footer", child:9} |
| 9 |  | {tag:"TEX_ NODE", value: "here is the footer"} |

Based on the updated data dictionary Table 3, the browser 504 may generate a command A including "U1 {child: [2,3,4,8]}; A8 {tag:"div", class:"footer",child:[9]}; A9 {tag:

"TEXT_NODE", value:"here is the footer"};timestamp: T1", in which "U1 {child: [2,3,4,8]}" indicates changes to child notes of the virtual DOM node with node index 1 at the timestamp T1 and current child nodes of the virtual DOM node with node index 1 includes the virtual DOM nodes with node indexed 2, 3, 4, 8, and "A8 {tag:"div",class:"footer", child:[9]}" indicates a newly added virtual DOM node with node index 8, node contents of which include "{tag:"div", class:"footer",child:[9]}" and "A9 {tag:"TEXT_NODE", value:"here is the footer"}" indicates a newly added virtual DOM node with node index 9, node contents of which include {tag: "TEXT_NODE",value:"here is the footer"}.

At timestamp T2, the user's interaction with the webpage 510 leads to modifications of the DOM node No. 7 of DOM code snippet 900 in which <Text_Node_Value="Some messages"/> of the DOM node No. 7 is modified to <Text_Node_Value="new messages"/>. FIG. 11 depicts an example DOM code snippet 1100 corresponding to timestamp T2 according to some embodiments of the present disclosure. The VDOM engine 505 may transform the modifications of the DOM node No. 7 into virtual DOM differentials.

FIG. 12 depicts an example virtual DOM code snippet 1200 corresponding to timestamp T2 according to some embodiments of the present disclosure. The virtual DOM code in block 1201 indicates the virtual DOM differentials changing values of the virtual DOM node with node index 7 from "some messages" to "new messages". The VDOM engine 505 then may render the webpage 510 based on virtual DOM differentials by calling the virtual DOM render function. The browser 504 may capture the virtual DOM differentials by the event monitor in the virtual DOM render function. Upon acquiring the virtual DOM differentials, the browser 504 may update the data dictionary Table 3 to reflect the virtual DOM differentials corresponding to the virtual DOM snippet 1200. Table 4 shows an updated data dictionary corresponding to the virtual DOM snippet 1200 in which the value of the virtual DOM node with node index 7 is changed from "some messages" to "new messages".

TABLE 4

| Node index | Node indexes of child nodes | Node contents |
|---|---|---|
| 0 |  | {tag: "body", child: 1} |
| 1 | 2,3,4,8 | {tag: "div", child: 2,3,4,8} |
| 2 |  | {tag: "div", class: "warning38"} |
| 3 |  | {tag: "textarea", readonly: "readonly", class: "monospaced", row:5} |
| 4 | 5 | {tag: "div", class: "foreceDeleteDiv", child: [5]} |
| 5 | 6,7 | {tag: "label", child: 6,7} |
| 6 |  | {tag: "input", name: "somevalue"} |
| 7 |  | {tag: "TEXT_NODE", value "new messages"} |
| 8 | 9 | {tag: "div", class: "footer", child:9} |
| 9 |  | {tag: "TEXT_NODE", value: "here is the footer"} |

As appreciate in the art, the example DOM code snippets in HTML and the example virtual DOM code snippets in JavaScript are for the purpose of illustration but are not intended to be limited to the embodiments disclosed. Any suitable or future emerging languages carrying out the purpose of the present disclosure may be applicable to aspects of the present disclosure.

Based on the updated data dictionary Table 4, the browser 504 may generate a command B including "U7 {value: "new messages", timestamp: T2}" which indicates changes to the virtual DOM node with node index 7 at timestamp T2 the current values of which include "new messages". After the webpage session A, the client 403 may send the commands A, B to the web server 401 together with the webpage session identifier 512. In response to receiving the commands A, B, the web server 401 may store the commands A, B and the webpage session identifier 512 into the storage 407 and record the mapping between commands A, B and the webpage session identifier 512.

Now turn to the web server side in FIG. 6. The web server 401 may generate 612 a base DOM 506 of the webpage 510 based on the webpage HTML document. The base DOM 506 of the webpage 510 is the same as the base DOM 509 generated in the client side, which is not repeated here. The web server 401 may load 613 the VDOM engine 501. VDOM engine 501 transforms 614 the base DOM of the webpage 510 into the base virtual DOM 514 of the webpage 510 which is the same as the base virtual DOM 513 generated from the client side. The web server 401 may assign 614 a memory address for each virtual DOM node. The web server 401 then may create 615 a data dictionary 503 based on the base virtual DOM 514 of the webpage 510 to include information regarding to the plurality of virtual DOM nodes of the virtual DOM. The content of the data dictionary 503 is the same as that of the data dictionary 508 created by the client side as described above, which is not repeated here. That is, the data dictionary 503 is always synchronized with the data dictionary 508. As described, the web server 401 and the client 403 may create its data dictionary separately. As an alternative embodiment, the data dictionary can be created in either side and be shared with each other. For example, the client 403 may create the data dictionary and send it to web server 401. In this case, it is not necessary for the web server 401 to create the data dictionary separately. Upon acquiring the virtual DOM differentials, the browser 504 need update the data dictionary at respective timestamps for a webpage session. The client 403 may send the updates of the data dictionary corresponding to respective timestamps to the web server 401. For each virtual DOM node, the web server 401 may record 616 a mapping between a memory address for the virtual DOM node and a node index for the virtual DOM node. In response to receiving one or more commands 511 and the webpage session identifier 512 from the client 403, the web server 401 may store 617 one or more commands 511 and the webpage session identifier 512 into the storage 407 and record 618 the mapping between commands 511 and the webpage session identifier 512.

Figure 13:
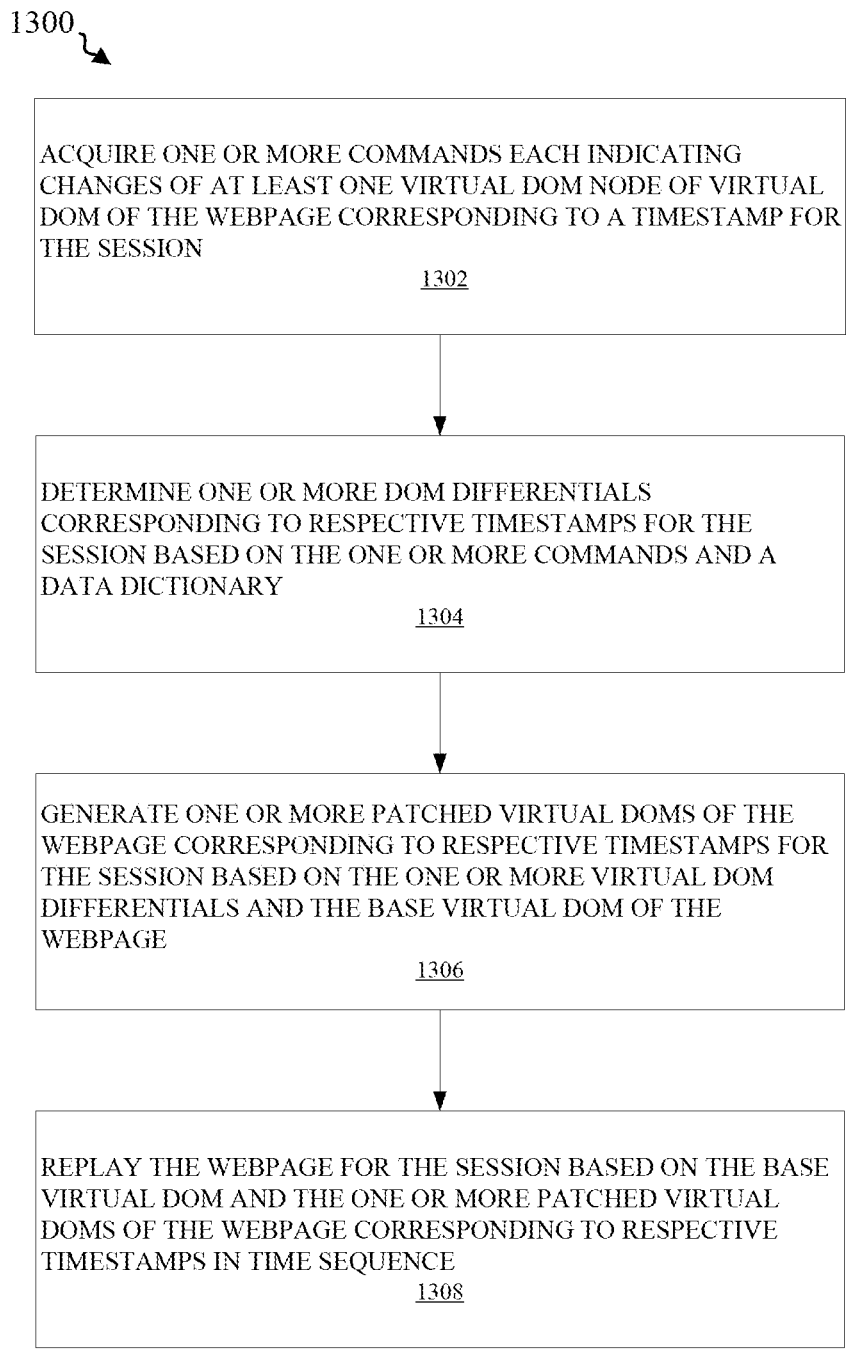
FIG. 13 depicts an example method for webpage replay according to some embodiments of the present disclosure.

FIG. 13 depicts an example method for webpage replay according to some embodiments of the present disclosure. The method 1300 may comprise steps 1302,1304,1306 and 1308 which can be implemented by the web server 401.

At step 1302, in response to a request for replaying a webpage for a session, the web server 401 may acquire one or more commands each indicating changes of at least one virtual DOM node of a virtual DOM of the webpage corresponding to a timestamp for the session.

At step 1304, the web server 401 may determine one or more virtual DOM differentials corresponding to respective timestamps for the session based on the one or more commands and a data dictionary, wherein the data dictionary is created based on a base virtual DOM of the webpage including a plurality of virtual DOM nodes to include information regarding to the plurality of virtual DOM nodes indicating a tree structure of the plurality of virtual DOM nodes.

At step 1306, the web server 401 may generate one or more patched virtual DOMs of the webpage corresponding to respective timestamps for the session based on the one or more virtual DOM differentials and the base virtual DOM of the webpage.

At step 1308, the web server 401 may replay the webpage for the session based on the base virtual DOM and the one or more patched virtual DOMs of the webpage corresponding to respective timestamps in time sequence.

In one embodiment, upon receiving the request for replay the webpage 510 for the session A, the web server 401 may acquire commands A, B corresponding to the webpage session identifier 512 of the session A. The web server may parse commands A, B to acquire changes of at least one virtual DOM node corresponding to timestamps T1 and T2. The web server 401 may acquire the data dictionary 503 corresponding to the base virtual DOM 514 shown in Table 2 from the storage 407. Based on commands A, B, the web server 401 may acquire updated data dictionaries shown in Table 3 and Table 4 respective corresponding to timestamps T1 and T2. The web server 401 then may determine virtual DOM differentials corresponding to timestamps T1 and T2 based on Table 3 and Table 4. The web server 401 may generate two patched virtual DOMs of the webpage 510 respective corresponding to timestamps T1 and T2. The patched virtual DOM of the webpage 510 corresponding to timestamp T1 is the same as the example virtual DOM code 1000 shown in FIG. 10. The patched virtual DOM of the webpage corresponding to timestamp T2 is the same as the example virtual DOM code 1200 shown in FIG. 12. The web server 401 may replay the webpage 510 for the session A based on the base virtual DOM 514 and the two patched virtual DOM of the webpage 510 respective corresponding to timestamps T1 and T2 in time sequence. In an embodiment, a VDOM engine may render a webpage based on virtual DOM differentials by calling the virtual DOM render function. Therefore, the VDOM engine 501 may render the webpage 510 based on base virtual DOM and the two patched virtual DOMs of the webpage 510 by calling the virtual DOM render function. In another embodiment, the web server 401 may transform two patched virtual DOMs of the webpage 510 respective corresponding to timestamps T1 and T2 into two patched DOMs of the webpage 510 corresponding to timestamps T1 and T2. The web server 401 may render the webpage 510 in a local viewport based on the base DOM of the webpage 510 and the two patched DOMs of the webpage 510 corresponding to timestamps T1 and T2 by calling a DOM render function.

According to the embodiments of the present disclosure, instead of transferring the full DOM or the differential DOM of the webpage to a web server, a client can generate one or more simplified commands indicating virtual DOM changes of the webpage to the web server and transferred the one or more simplified commands to the web server, which can significantly reduce data transfer over the network. Webpage replay can be implemented in a more efficient way by parsing the commands.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wire transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   acquiring, by one or more processing units, one or more commands each indicating changes of at least one virtual Document Object Model (DOM) node of a virtual DOM of a webpage corresponding to a timestamp for a session;
   determining, by one or more processing units, one or more virtual DOM differentials corresponding to respective timestamps for the session based on the one or more commands and a first data dictionary, wherein the first data dictionary is created based on a base virtual DOM of the webpage including a plurality of virtual DOM nodes to comprise information regarding to the plurality of virtual DOM nodes indicating a tree structure of the plurality of virtual DOM nodes, and wherein the determining further comprises:
     parsing, by one or more processing units, each of the one or more commands to acquire changes of at least one virtual DOM node at a timestamp for the session and at least one node index corresponding to the at least one virtual DOM node;
     updating, by one or more processing units, the first data dictionary based on the changes of the at least one virtual DOM node at the timestamp for the session and at least one node index corresponding to the at least one virtual DOM node; and
     determining, by one or more processing units, virtual DOM differentials corresponding to the timestamp for the session based on the updated first data dictionary;
   generating, by one or more processing units, one or more patched virtual DOMs of the webpage corresponding to respective timestamps for the session based on the one or more virtual DOM differentials and the base virtual DOM of the webpage; and
   replaying, by one or more processing units, the webpage for the session based on the base virtual DOM and the one or more patched virtual DOMs of the webpage corresponding to respective timestamps in time sequence.

2. The method of claim 1, wherein the information regarding to the plurality of virtual DOM nodes comprises a node index, node indexes of child nodes, and node contents.

3. The method of claim 1, further comprising:
   in response to a request for a webpage, sending, by one or more processing units, the webpage to a client;
   creating, by one or more processing units, a base DOM of the webpage;
   transforming, by one or more processing units, the base DOM of the webpage into the base virtual DOM of the webpage; and
   creating, by one or more processing units, the first data dictionary based on the base virtual DOM of the webpage.

4. The method of claim 3, further comprising:
   receiving, by one or more processing units, the one or more commands and a webpage session identifier of the session from the client.

5. The method of claim 4, wherein the one or more commands are generated by the client through:
   creating, by one or more processing units, the base DOM of the webpage;
   transforming, by one or more processing units, the base DOM of the webpage into the base Virtual DOM of the webpage including the plurality of virtual DOM nodes;
   creating, by one or more processing units, a second data dictionary based on the base virtual DOM of the webpage, the second data dictionary being the same as the first data dictionary;

capturing, by one or more processing units, the virtual DOM differentials corresponding to respective timestamps by an event monitor from a virtual DOM render function;

updating, by one or more processing units, the second data dictionary based on the virtual DOM differentials;

determining, by one or more processing units, at least one node index of at least one Virtual DOM node that have changed at respective timestamps for the session based on the updated second data dictionary; and generating, by one or more processing units, the one or more commands according to a predefined generation rule, each of the one or more commands indicating changes of at least one virtual DOM node corresponding to a timestamp for the session based on the at least one node index and the virtual DOM differentials.

6. The method of claim 1, wherein the replaying the webpage for the session based on the base virtual DOM and the plurality of patched virtual DOMs of the webpage corresponding to respective timestamps in time sequence further comprises:

rendering, by one or more processing units, the webpage based on the base virtual DOM of the webpage and the plurality of patched virtual DOMs of the webpage corresponding to respective timestamps by calling a virtual DOM render function.

7. The method of claim 1, wherein the replaying the webpage for the session based on the base virtual DOM and the plurality of patched virtual DOMs of the webpage corresponding to respective timestamps in time sequence further comprises:

transforming, by one or more processing units, the plurality of patched virtual DOMs of the webpage corresponding to respective timestamps into one or more patched DOMs of the webpage corresponding to respective timestamps; and rendering, by one or more processing units, the webpage in a local viewport based on the base DOM of the webpage and the plurality of patched DOMs of the webpage corresponding to respective timestamps by calling a DOM render function.

8. The method of claim 1, wherein the changes of at least one virtual DOM node of virtual DOM of the webpage comprises at least one of an insertion, a deletion, and a modification of at least one virtual DOM node of the virtual DOM.

9. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

acquiring one or more commands each indicating changes of at least one virtual Document Object Model (DOM) node of virtual DOM of a webpage corresponding to a timestamp for a session;

determining one or more virtual DOM differentials corresponding to respective timestamps for the session based on the one or more commands and a first data dictionary, wherein the first data dictionary is created based on a base virtual DOM of the webpage including a plurality of virtual DOM nodes to comprise information regarding to the plurality of virtual DOM nodes indicating a tree structure of the plurality of virtual DOM nodes, and wherein the determining further comprises:

parsing each of the one or more commands to acquire changes of at least one virtual DOM node at a timestamp for the session and at least one node index corresponding to the at least one virtual DOM node;

updating the first data dictionary based on the changes of the at least one virtual DOM node at the timestamp for the session and at least one node index corresponding to the at least one virtual DOM node; and determining virtual DOM differentials corresponding to the timestamp for the session based on the updated first data dictionary;

generating one or more patched virtual DOMs of the webpage corresponding to respective timestamps for the session based on the one or more virtual DOM differentials and the base virtual DOM of the webpage; and replaying the webpage for the session based on the base virtual DOM and the one or more patched virtual DOMs of the webpage corresponding to respective timestamps in time sequence.

10. The system of claim 9, wherein the information regarding to the plurality of virtual DOM nodes comprises a node index, child nodes, and node contents.

11. The system of claim 9, the method further comprises:
in response to a request for a webpage, sending the webpage to a client;
creating a base DOM of the webpage;
transforming the base DOM of the webpage into the base virtual DOM of the webpage; and
creating the first data dictionary based on the base virtual DOM of the webpage.

12. The system of claim 11, further comprising:
receiving the one or more commands and a webpage session identifier of the session from the client.

13. The system of claim 12, wherein the one or more commands are generated by the client through:
creating the base DOM of the webpage;
transforming the base DOM of the webpage into the base Virtual DOM of the webpage including the plurality of virtual DOM nodes;
creating a second data dictionary based on the base virtual DOM of the webpage, the second data dictionary being the same as the first data dictionary;
capturing the virtual DOM differentials corresponding to respective timestamps by an event monitor from a virtual DOM render function;
updating the second data dictionary based on the virtual DOM differentials;
determining at least one node index of at least one Virtual DOM node that have changed at respective timestamps for the session based on the updated second data dictionary; and
generating the one or more commands according to a predefined generation rule, each of the one or more commands indicating changes of at least one virtual DOM node corresponding to a timestamp for the session based on the at least one node index and the virtual DOM differentials.

14. The system of claim 9, wherein the replaying the webpage for the session based on the base virtual DOM and the plurality of patched virtual DOMs of the webpage corresponding to respective timestamps in time sequence further comprises:

rendering the webpage based on the base virtual DOM of the webpage and the plurality of patched virtual DOMs of the webpage corresponding to respective timestamps by calling a virtual DOM render function.

15. The system of claim 9, wherein the replaying the webpage for the session based on the base virtual DOM and the one or more patched virtual DOMs of the webpage corresponding to respective timestamps in time sequence further comprises:
  transforming the plurality of patched virtual DOMs of the webpage corresponding to respective timestamps into one or more patched DOMs of the webpage corresponding to respective timestamps; and
  rendering the webpage in a local viewport based on the base DOM of the webpage and the plurality of patched DOMs of the webpage corresponding to respective timestamps by calling a DOM render function.

16. A computer program product, the computer program product comprising:
  one or more computer-readable tangible storage media and program instructions stored on at least one of the one or more computer-readable tangible storage media, the program instructions executable by a processor to cause the processor to perform a method comprising:
    acquiring one or more commands each indicating changes of at least one virtual Document Object Model (DOM) node of virtual DOM of a webpage corresponding to a timestamp for a session;
    determining one or more virtual DOM differentials corresponding to respective timestamps for the session based on the one or more commands and a first data dictionary, wherein the first data dictionary is created based on a base virtual DOM of the webpage including a plurality of virtual DOM nodes to comprise information regarding to the plurality of virtual DOM nodes indicating a tree structure of the plurality of virtual DOM nodes, and wherein the determining further comprises:
      parsing each of the one or more commands to acquire changes of at least one virtual DOM node at a timestamp for the session and at least one node index corresponding to the at least one virtual DOM node;
      updating the first data dictionary based on the changes of the at least one virtual DOM node at the timestamp for the session and at least one node index corresponding to the at least one virtual DOM node; and
      determining virtual DOM differentials corresponding to the timestamp for the session based on the updated first data dictionary;
    generating one or more patched virtual DOMs of the webpage corresponding to respective timestamps for the session based on the one or more virtual DOM differentials and the base virtual DOM of the webpage; and
    replaying the webpage for the session based on the base virtual DOM and the one or more patched virtual DOMs of the webpage corresponding to respective timestamps in time sequence.

17. The computer program product of claim 16, wherein the information regarding to the plurality of virtual DOM nodes comprises a node index, node indexes of child nodes, and node contents.

18. The computer program product of claim 16, the method further comprises:
  in response to a request for a webpage, sending the webpage to a client;
  creating a base DOM of the webpage;
  transforming the base DOM of the webpage into the base virtual DOM of the webpage; and
  creating the first data dictionary based on the base virtual DOM of the webpage.

* * * * *